United States Patent [19]

Ratony

[11] 4,053,125

[45] Oct. 11, 1977

[54] STAGGERED CHANNEL WING-TYPE AIRCRAFT

[76] Inventor: Alexander Ratony, 3264 Royal Ave., Simi Valley, Calif. 93065

[21] Appl. No.: 702,740

[22] Filed: July 6, 1976

Related U.S. Application Data

[63] Continuation-in-part of Ser. No. 393,220, Aug. 30, 1973, Pat. No. 3,981,460.

[51] Int. Cl.² .................... B64C 3/06; B64C 3/40
[52] U.S. Cl. ................... 244/46; 244/45 R
[58] Field of Search ............... 244/13, 35 R, 45 R, 244/43, 46, 47, 49, 42 R, 34 R, 34 A, 40

[56] References Cited

U.S. PATENT DOCUMENTS

| 1,264,037 | 4/1918 | Emmons | 244/45 R |
| 2,461,805 | 2/1949 | Barker | 244/45 R |
| 2,576,294 | 11/1951 | Geraci | 244/45 R |
| 2,699,300 | 1/1955 | Trotter et al. | 244/46 |

FOREIGN PATENT DOCUMENTS

| 42,428 | 7/1933 | France | 244/45 R |
| 1,210,930 | 3/1960 | France | 244/45 R |
| 609,523 | 1/1933 | Germany | 244/43 |

*Primary Examiner*—Trygve M. Blix
*Assistant Examiner*—Galen L. Barefoot
*Attorney, Agent, or Firm*—Craig O. Malin

[57] ABSTRACT

A staggered channel aircraft having a forward pair of wings and a rearward pair of wings. The forward pair of wings are substantially horizontal and are swept backward from the fuselage to join at their tips the pair of rearward wings. The rearward wings are sloping and are swept backward from their tips to join the fuselage in a substantially triangular-like configuration.

10 Claims, 14 Drawing Figures

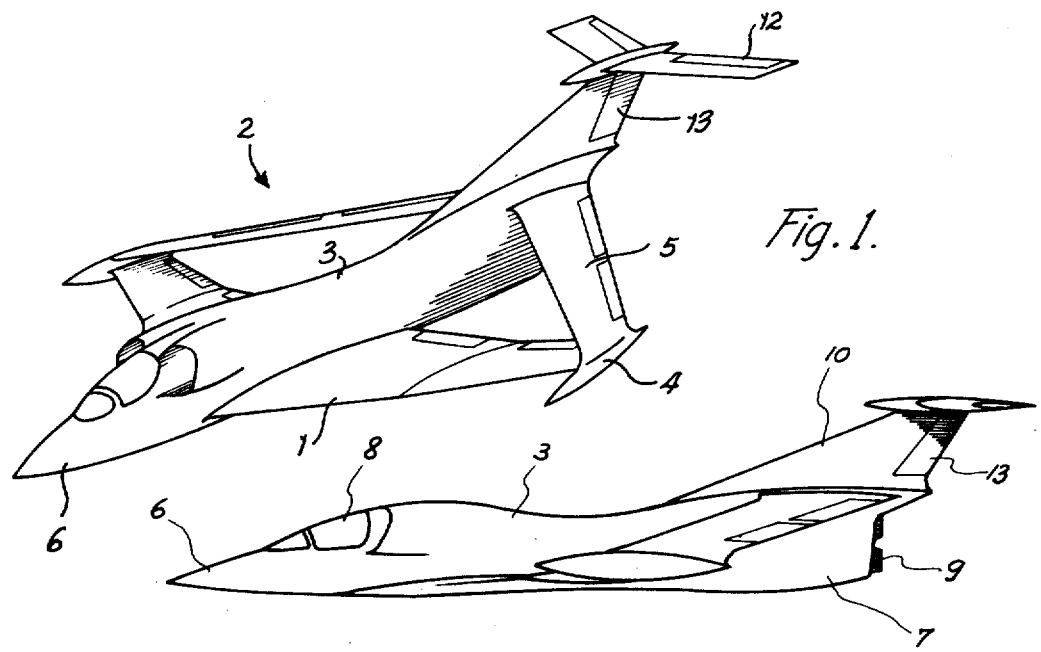
Fig. 1.
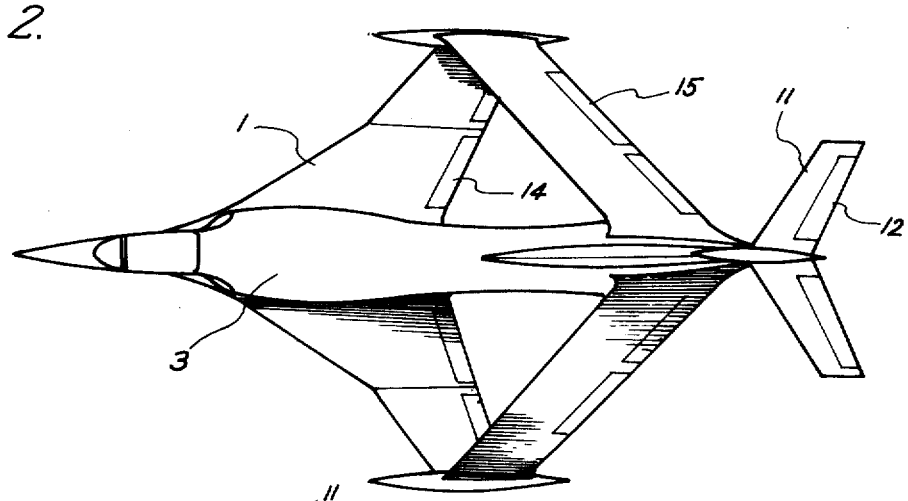
Fig. 2.
Fig. 3.
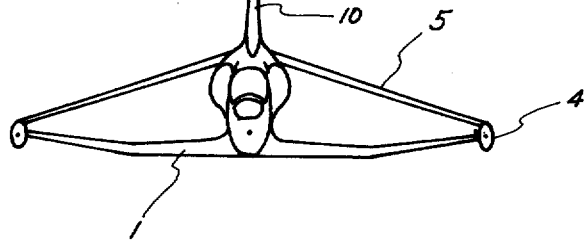
Fig. 4.

STAGGERED CHANNEL WING-TYPE AIRCRAFT

CROSS REFERENCE TO RELATED APPLICATIONS

This application is a Continuation-In-Part of my copending application, Ser. No. 393,220 filed August 30, 1973, now U.S. Pat. No. 3,981,460 entitled "Staggered Channel Wing-Type Aircraft".

BACKGROUND OF THE INVENTION

1. Field of the Invention

This invention pertains to the field of aircraft wings, and particularly to a dual wing system for aircraft requiring low induced drag, good maneuverability, and short take off and landing.

2. Description of the Prior Art

Conventional aircraft are built for low speed or high speed. In low speed aircraft, the wingspan is usually large, which creates a tremendous amount of drag, and because of this drag the airplane is slow. On high speed aircraft, usually the wingspan is reduced to a minimum to eliminate the drag and is counterbalanced with high powered engines. Because of this short wingspan, heavy engine and equipment, the airplane has no gliding ability. Thus the stalling speed of this aircraft is very high, which makes the aircraft uncontrollable at the low speed in case of engine failure. These type of aircraft need super long runways to land and take off which limit all of these aircraft to about 70% of the airfields (except military) in this country and possibly more overseas.

Conventional aircraft also have a load factor problem because their lifting capabilities change drastically with the aircraft's bank angle. The lift capability of conventional aircraft is highest only when the aircraft is traveling in a horizontal position. However, if the aircraft makes a 90° bank the load factor required is infinite because there is no lifting surface at this angle.

SUMMARY OF THE INVENTION

It is an object of the invention to provide an improved aircraft capable of high speed flight and a relatively low landing speed with or without power.

It is a further object of the invention to provide an aircraft which is storable in a relatively small space because the wingspan is reduced to a minimum while still maintaining a rather large wing area.

It is an object of the invention to provide an aircraft which requires less power but is still capable of operating efficiently at speeds ranging from slow to supersonic.

It is an object of the invention to provide an aircraft with staggering wings which can be moved to vary the wingspan and sweepangle to provide optimum flight characteristics at different flight speeds.

It is an object of the invention to provide an aircraft with staggered wings which can be moved with respect to the plane's fuselage to account for changes in the center of gravity of the aircraft.

It is an object of the invention to provide a staggered wing design which makes it possible for an individual to build a safe, fast, and relatively inexpensive aircraft.

It is an object of the invention to provide a wing design which gives the aircraft an improved load factor at steep bank angles.

According to the invention, an aircraft is provided having two pairs of wings forming a staggered channel. A pair of substantially horizontal forward wings are swept back from the aircraft's fuselage. At their tips, the forward wings join the tips of a pair of sloping rearward wings. The rearward wings are swept backward and join the fuselage in a substantially triangular-like configuration.

BRIEF DESCRIPTION OF THE DRAWINGS

The invention will now be described in detail with reference to the accompanying drawings representing preferred embodiments of a staggered channel wing-type aircraft according to the present invention. In the drawings:

FIG. 1 is a perspective view of an aircraft according to one embodiment of this invention;

FIG. 2 is a side view of the aircraft of FIG. 1;

FIG. 3 is a top view of the aircraft of FIG. 1;

FIG. 4 is a front view of the aircraft of FIG. 1;

DESCRIPTION OF THE PREFERRED EMBODIMENTS

Figure 5:
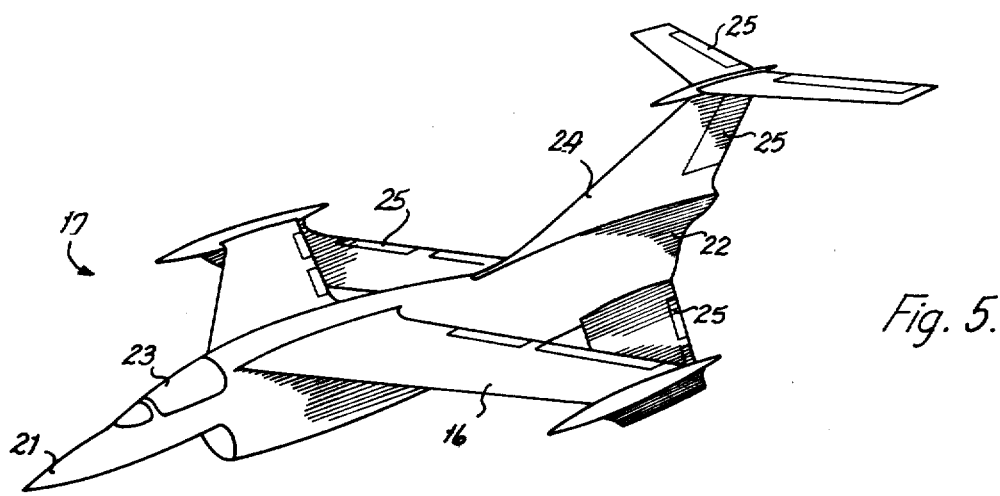
FIG. 5 is a perspective view of an aircraft according to a second embodiment of this invention.

FIGS. 1–4 show an embodiment in which a pair of forward wings 1 of aircraft 2 are rigidly fastened to the lower portion of fuselage 3. As shown best in FIG. 4, the forward wings 1 are substantially horizontal. The forward wings 1 are swept backward from the fuselage 3 and joined at their tips 4 to the tips of the pair of rearward wings 5.

The rearward wings 5 are swept backward and upward to join the upper portion of the fuselage 3 as shown in FIGS. 3 and 4. Thus, the forward and rearward wings are staggered from each other, and they form a channel between them. Since the rearward wings 5 are sloped upward, they provide lift even when the aircraft is steeply banked.

The fuselage 3 has a nose 6, aft section 7, and a passenger section 8. The propulsion means is a jet engine 9 housed in the aft section 7 of the fuselage.

The tail 10 extends upward from the aft section 7 and has a horizontal surface 11 forming a T-shape. The horizontal surface 11 has moveable control surfaces 12, 13. Moveable control surfaces 14 are also provided on the forward wings 1. Additional control surfaces 15 may also be provided on the rearward wings 5.

Figure 6:
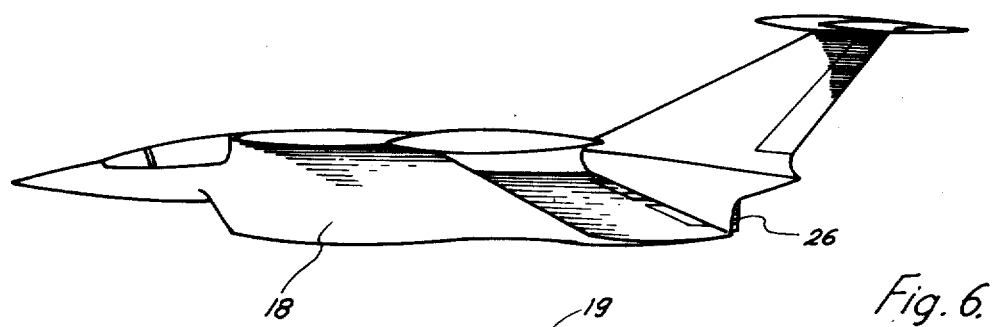
FIG. 6 is a side view of the aircraft of FIG. 5.
Figure 7:
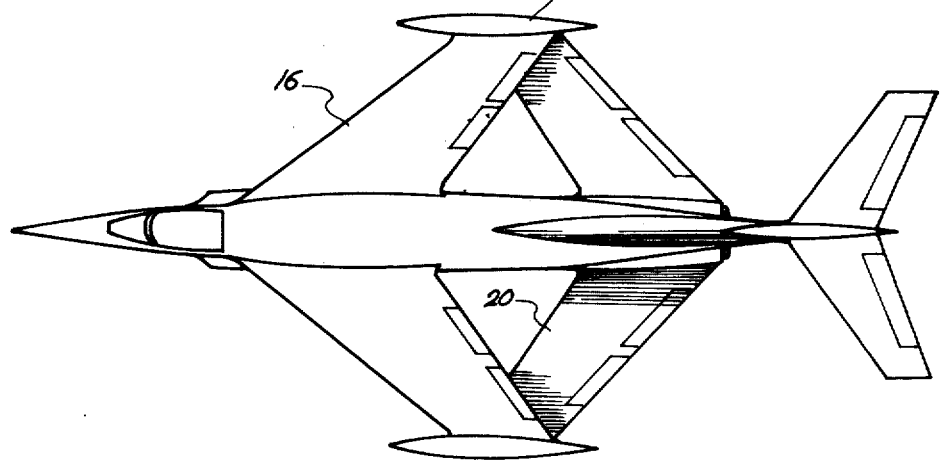
FIG. 7 is a top view of the aircraft of FIG. 5.
Figure 8:
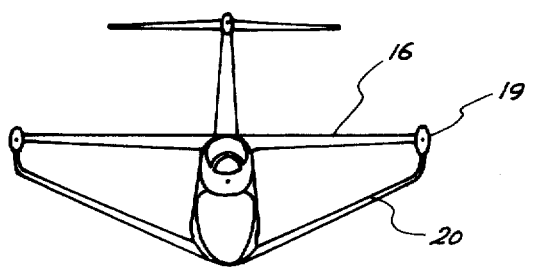
FIG. 8 is a front view of the aircraft of FIG. 5.

FIGS. 5–9 show an embodiment in which the forward wings 16 of aircraft 17 are rigidly fastened to the upper portion of fuselage 18. As best shown in FIG. 8, the forward wings 16 are substantially horizontal. The forward wings 16 are swept backward from fuselage 18 and joined at their tips 19 to the tips of the pair of rearward wings 20.

The rearward wings 20 are swept backward and downward to join the lower portion of fuselage 18 as shown clearly in FIGS. 6 and 7. Thus, a channel similar to the channel described for the aircraft of FIGS. 1–4 is formed by the staggered wings.

Like the previously discussed aircraft 2, aircraft 17 has a nose 21, aft section 22, passenger section 23, tail 24, control surfaces 25, and a jet engine 26.

Figure 9:
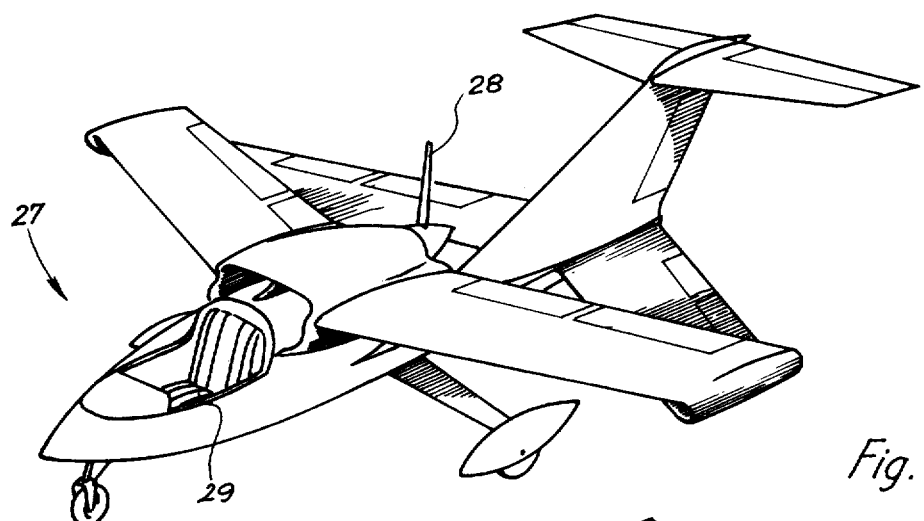
FIG. 9 is a perspective view of an aircraft according to a third embodiment of this invention.

FIG. 9 shows a modification of the embodiment of aircraft 17 intended for relative low cost private use. The aircraft 27 shows the wide range of use for which the staggered channel wing is suitable. Aircraft 27 is powered by a pusher-type propellor 28 located behind the passenger section 29. The wingspan is short enough to fit in a regular garage and yet considerable wing area for slow flight is still provided by the bi-wing design. Additionally, the triangular configuration of the wings on each side of the aircraft provide a safe rigid structure at a minimum cost.

FIGS. 10–14 show an aircraft 30 similar to the aircraft 17 shown in FIG. 5 except the forward wings 31 and rearward wings 32 can move along the length of fuselage 33. The tips of wings 31, 32 are joined together by a pivot 34 and a mechanism within the fuselage 33 permits the wings to move independently in a scissor fashion.

Figure 14:
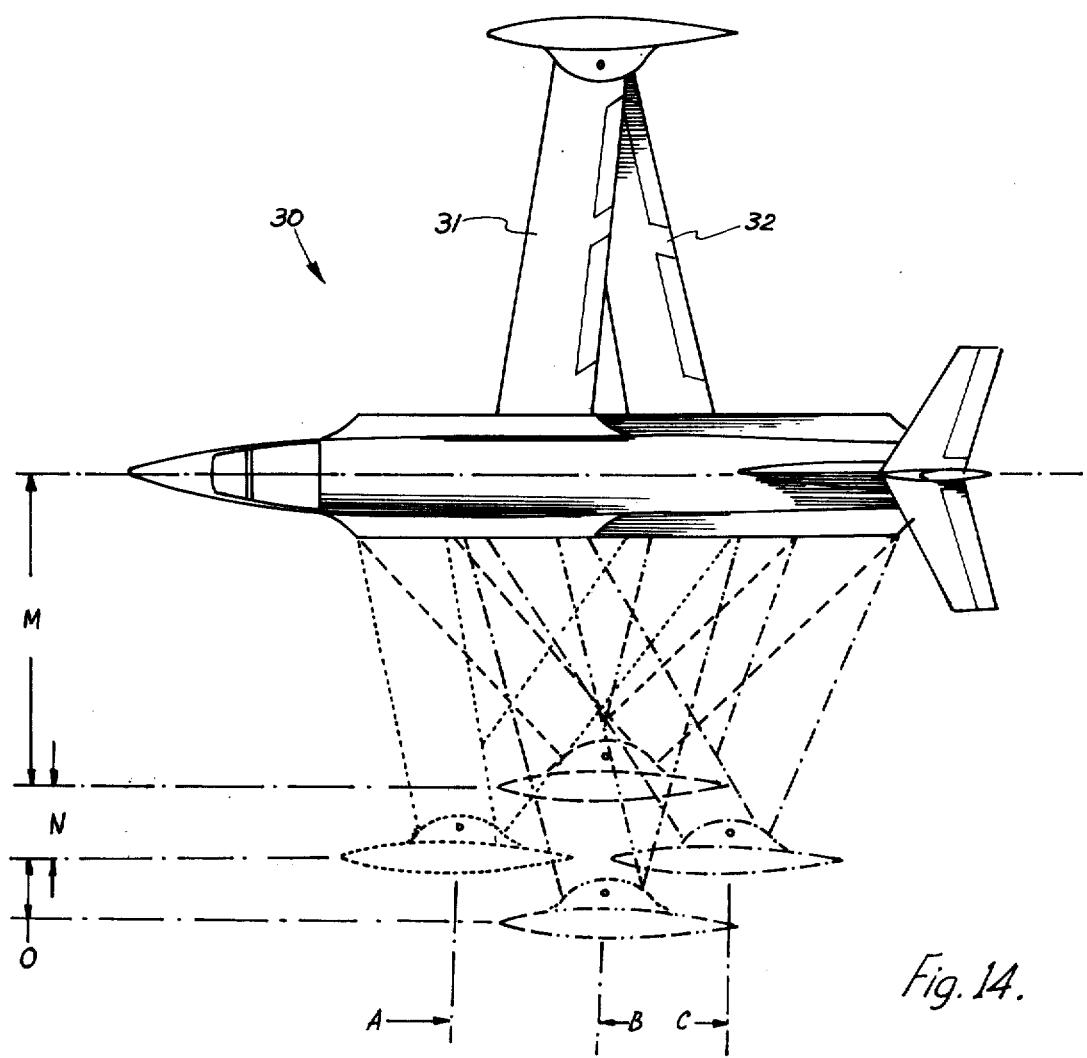
FIG. 14 is a top view of the aircraft of FIG. 10 showing the moveable wings in different positions.

As shown in FIG. 14, movement of the wings can change the planes wingspan from a minimum wingspan M when the wings are at their maximum spread to a maximum wingspan O when the wings are closest together. Intermediate wingspans N are obtained at intermediate settings of wing spacing. This ability to change the wingspan enables the aircraft 30 to change the sweep angle of the wings and optimize its operation for a wide range of speeds and altitudes.

Similarly the position of the wings 31, 32 can be varied to account for changes in the center of gravity of the aircraft. A heavily loaded plane can have a significantly differnt center of gravity than an empty plane. In military aircraft, the release of a heavy load of missiles can shift the plane's center of gravity. This change in center of gravity can be compensated for by shifting the position of the wings. For example, in FIG. 14 "A" shows an extreme forward wing position, "B" an intermediate wing position and "C" an extreme rearward wing position.

Figure 10:
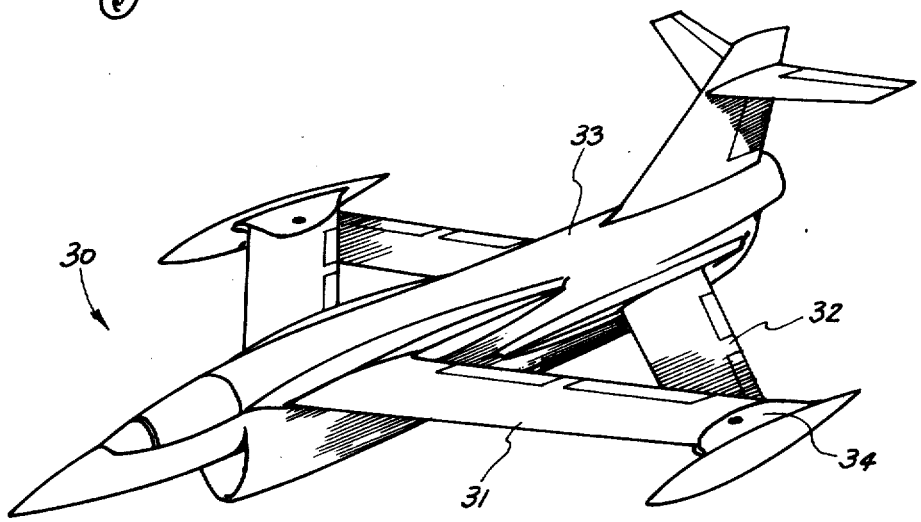
FIG. 10 is a perspective view of an aircraft according to a fourth embodiment of this invention.
Figure 11:
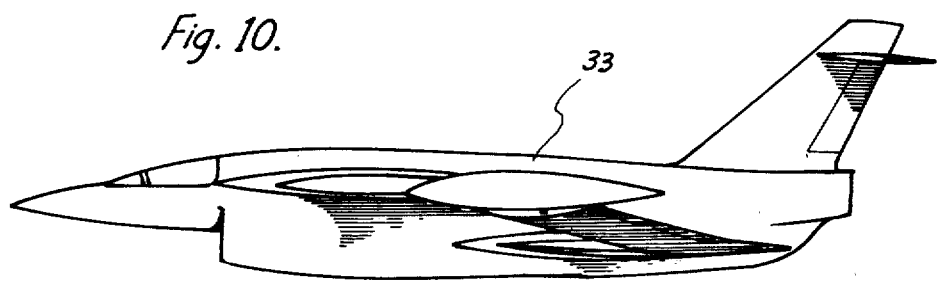
FIG. 11 is a side view of the aircraft of FIG. 10.
Figure 12:
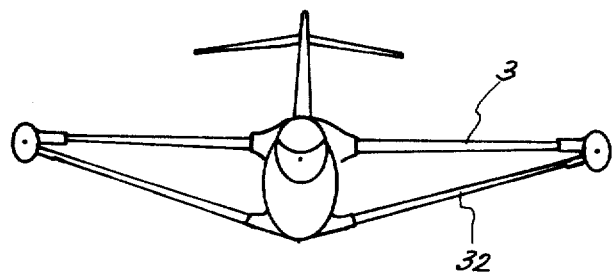
FIG. 12 is a front view of the aircraft of FIG. 10.
Figure 13:
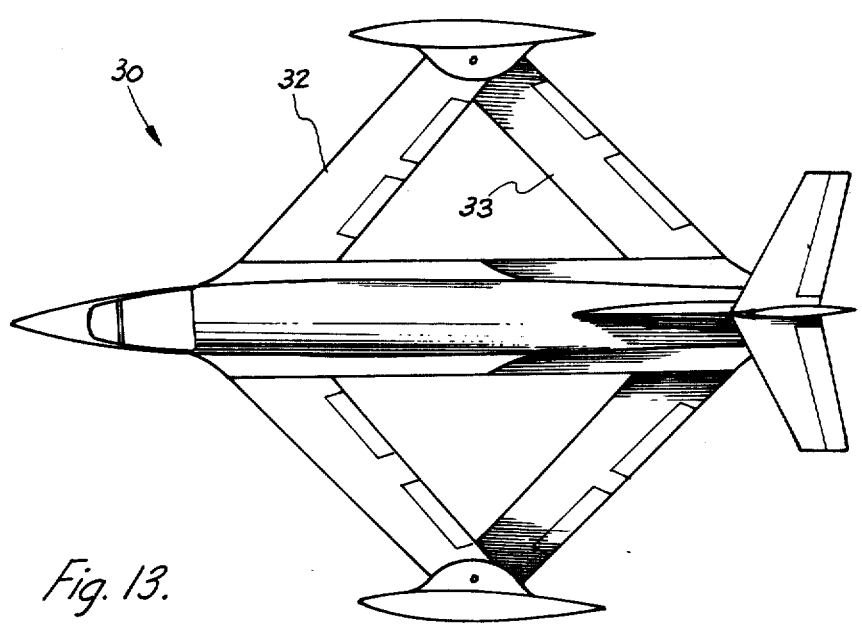
FIG. 13 is a top view of the aircraft of FIG. 10.

Of course, the staggered channel wing design of aircraft 30 can be based upon the lower forward wing configuration of aircraft 2 as well as the upper forward wing design shown in FIG. 10.

From the foregoing, it can be readily realized that this invention can assume various embodiments. Thus it is to be understood that the invention is not limited to the specific embodiments described herein, but is to be limited only by the appended claims.

What is claimed is:

1. A staggered channel wing-type aircraft comprising:

a fuselage with a nose, a passenger section, and an aft section;
   a propulsion means coupled to said fuselage;
   a pair of substantially horizontal forward wings having leading and trailing edges, said forward wings and said leading and trailing edges, thereof being swept backward from said fuselage;
   a pair of sloping rearward wings having leading and trailing edges, each of said rearward wings being attached to its tip to a corresponding tip of said forward wings, said rearward wings and said leading and trailing edges thereof being swept slopingly backward to join said fuselage, each of said rearward wings, forward wings, and fuselage forming a substantially triangular-like configuration, said trailing edge of said forward wing being spaced apart forward of said leading edge of said rearward wing, except adjacent their tips;
   a tail extending vertically from said aft section; and
   control surfaces on said tail and on said pair of substantially horizontal forward wings.

2. The staggered channel wing-type aircraft as claimed in claim 1, wherein said pair of substantially horizontal forward wings are swept backward from the upper portion of said fuselage, and said pair of sloping rearward wings are joined to the lower portion of said fuselage.

3. The staggered channel wing-type aircraft as claimed in claim 1, wherein said pair of substantially horizontal forward wings are swept backward from the lower portion of said fuselage, and said pair of sloping rearward wings are joined to the upper portion of said fuselage.

4. The staggered channel wing-type aircraft as claimed in claim 1, wherein said tail has a horizontal surface whereby said tail has a "T" shape.

5. The staggered channel wing-type aircraft as claimed in claim 1, including additional control surfaces on said pair of sloping rearward wings.

6. The staggered channel wing-type aircraft as claimed in claim 1, wherein said pair of forward wings and said pair of rearward wings are attached rigidly to said fuselage, and are attached rigidly to each other at their tips.

7. The staggered channel wing-type aircraft as claimed in claim 1, wherein said pair of forward wings and said pair of rearward wings are moveably coupled to said fuselage and are pivotally attached to each other at their tips, whereby the sweep angle and wingspan of said pair of wings is variable.

8. A staggered channel wing-type aircraft comprising:

a fuselage with a nose, a passenger section, and an aft section;
   a propulsion means coupled to said fuselage;
   a pair of substantially horizontal forward wings having leading and trailing edges and attached rigidly to the lower portion of said fuselage, said forward wings and said leading and trailing edges thereof being swept backward from said fuselage;
   a pair of sloping rearward wings having leading and trailing edges, each of said rearward wings being attached rigidly at its tip to a corresponding tip of said forward wings, said rearward wings and said leading and trailing edges thereof being swept slopingly upward and backward to join the upper portion of said fuselage each of said rearward wings, forward wings, and fuselage forming a substantially triangular-like configuration, said trailing edge of said forward wing being spaced apart forward of said leading edge of said rearward wing, except adjacent their tips;
   a tail extending vertically from said aft section; and
   control surfaces on said tail and on said pair of substantially horizontal forward wings.

9. A staggered channel wing-type aircraft comprising:

a fuselage with a nose, a passenger section, and an aft section;
   a propulsion means coupled to said fuselage;

a pair of substantially horizontal forward wings having leading and trailing edges and attached rigidly to the upper portion of said fuselage, said forward wings and said leading and trailing edges thereof being swept backward from said fuselage;

a pair of sloping rearward wings having leading and trailing edges, each of said rearward wings being attached rigidly at its tips to a corresponding tip of said forward wings, said rearward wings and said leading and trailing edges thereof being swept slopingly downward and backward to join rigidly the lower portion of said fuselage each of said rearward wings, forward wings, and fuselage forming a substantially triangular-like configuration, said trailing edge of said forward wing being spaced apart forward of said leading edge of said rearward wing, except adjacent their tips;

a tail extending vertically from said aft section; and control surfaces on said tail and on said pair of substantially horizontal forward wings.

10. A staggered channel wing-type aircraft comprising:

a fuselage with a nose, a passenger section, and an aft section;

a propulsion means coupled to said fuselage;

a pair of substantially horizontal forward wings having leading and trailing edges, said forward wings and said leading and trailing edges thereof being swept backward from said fuselage and joined in a moveable relation to said fuselage;

a pair of sloping rearward wings having leading and trailing edges, each of said rearward wings being pivotally attached at its tip to a corresponding tip of said forward wings, said rearward wings and said leading and and trailing edges thereof being swept slopingly backward to join in a movable relation to said fuselage, each of said rearward wings, forward wings, and fuselage forming a substantially triangular-like configuration, said trailing edge of said forward wing being spaced apart forward of said leading edge of said rearward wing, except adjacent their tips;

a tail extending vertically from said aft section; and control surfaces on said tail and on said pair or substantially horizontal forward wings.

* * * * *